United States Patent [19]

Studer

[11] 4,000,929
[45] Jan. 4, 1977

[54] MAGNETIC BEARING SYSTEM

[75] Inventor: Philip A. Studer, Silver Spring, Md.

[73] Assignee: The United States of America as represented by the United States National Aeronautics and Space Administration, Washington, D.C.

[22] Filed: July 3, 1975

[21] Appl. No.: 593,142

[52] U.S. Cl. ................................................. 308/10
[51] Int. Cl.² ..................................... F16C 39/00
[58] Field of Search ................ 308/10; 310/67, 66, 310/263, 262; 233/DIG. 1, 1 A, 23, 24; 74/5.7, 5.9, 5.5

[56] References Cited
UNITED STATES PATENTS 3,209,152   9/1965   Brouwer .............................. 308/10
3,694,041   9/1972   Studer ................................. 308/10
3,820,859   6/1974   Brown ................................. 308/10
3,845,995   11/1974  Wehde ................................ 308/10
3,909,082   9/1975   Ishikawa ............................. 308/10

Primary Examiner—R. Skudy
Attorney, Agent, or Firm—Ronald F. Sandler; Gary F. Grafel; John R. Manning

[57] ABSTRACT

A single magnetic, radial bearing having a disc with an axis coincident with the bearing or shaft axis, the bearing passively supporting an annulus which forms a radial gap between its inner circumferential edge and the circumferential edge of the disc. The disc has a relatively large diameter compared to its length along the axis.

33 Claims, 11 Drawing Figures

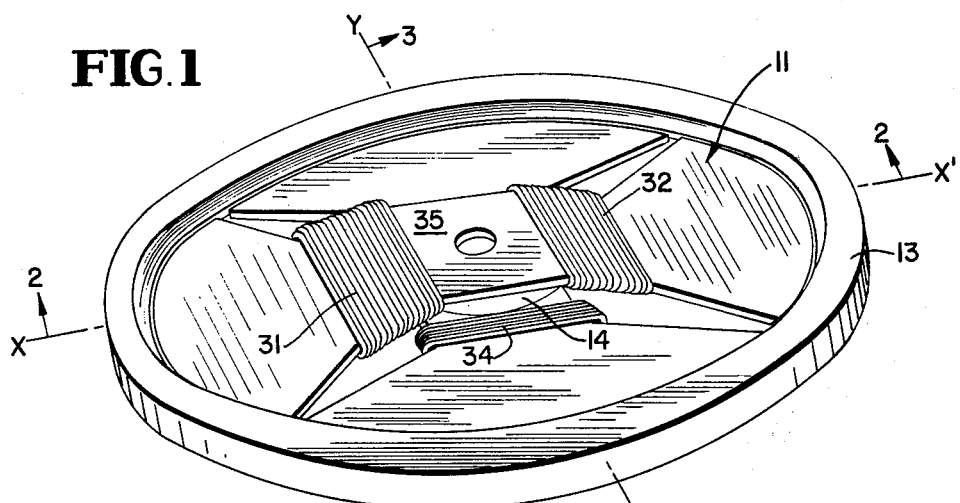
FIG.1
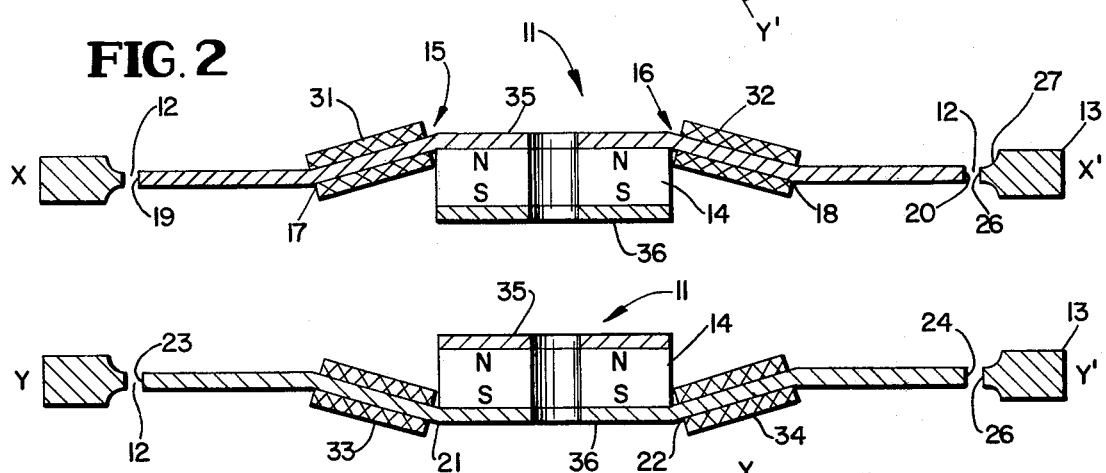
FIG.2
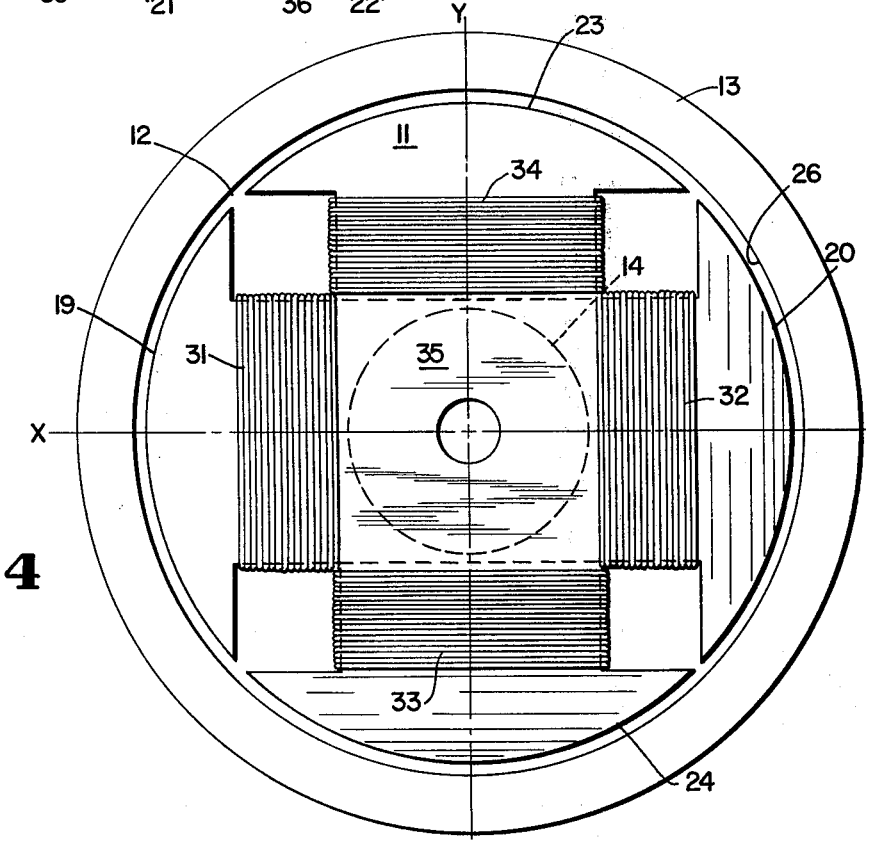
FIG.3
FIG.4

MAGNETIC BEARING SYSTEM

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates generally to magnetic bearings and more particularly to a radial magnetic bearing.

BACKGROUND OF THE INVENTION

To support a shaft with stability and resist torsional loads and/or tilting motions, prior art bearings, both of the mechanical and magnetic types, have generally been matched in pairs at opposite ends of the supported shaft. Typically, arranging the magnetic bearings in pairs is complicated by the inherent instability of the bearings about axes other than the axis of the shaft being supported. Two techniques have generally been employed in the past to overcome this instability, viz: (1) to increase the axial separation between the magnetic bearings and (2) to provide active control channels for the angular position of the bearing members to assure that the bearing members lie in a plane at right angles to the shaft axis. In many cases, it is impractical to separate the bearing members to an extent sufficient to attain the required stability. Imposing active controls, rather than passive restraints, on the angular position of the bearing members in a plane at right angles to the shaft being supported tends to defeat the potentially high reliability of a magnetic bearing system.

Radial bearings, of a type disclosed in my U.S. Pat. No. 3,694,041 remove the requirements for the bearing members to be in matched pairs at opposite ends of a shaft. However, experiments since conducted indicate that additional work had to be performed to enable such radial bearings to have the required passive stability in a plane (the $x-y$ plane) at right angles to the shaft axis (the $z$-axis when the bearing system is properly aligned). In particular, a central shaft carrying disc member, when tilted in the $x-y$ plane in response to an external load, has a tendency to become stable at an angle different from that of an annular member surrounding the disc, i.e., the disc has a tendency to become stable at an angle removed from the $x-y$ plane or to be tilted from its desired position. It has now been found that the tilting tendency occurs because the pole faces of the annulus and disc are displaced from each other along the $z$-axis and because the disc pole faces extend parallel to the shaft axis. Thereby, as the annular member tilts about the $z$-axis, corresponding points on the axially displaced pole faces of the disc become separated by different distances from the points on the annulus with which they are normally aligned. For example, a clockwise turning about a vertically oriented $z$ axis causes a point on the pole face below and to the left of the center (the point about which the tilting is presumed to occur) of the disc to initially rotate to and through a radial line extending from the center of the disc through the points on disc pole face and on the pole face of the annulus which is normally aligned with the disc pole face point. This is analogous to a toggle action. Hence, the separation between the normally aligned points below and to the left of the disc center is initially decreased. In contrast, the corresponding aligned points on the pole faces of the disc and annulus above and to the left of the disc center initially and continually turn away from a radial line extending through the point on the annulus with which it is normally aligned. Because of the differential displacement, and the non-linear force displacement character of magnetic force, there are differential forces between the pole faces which are displaced along the $z$-axis. These differential forces have a tendency to cause further tilting and are not overcome until the annular member reaches a substantial tilt angle away from the $z$-axis.

BRIEF DESCRIPTION OF THE INVENTION

In accordance with the present invention, a single magnetic, radial bearing passively supports an annulus in a plane at right angles to the longitudinal axis of the disc (which axis is coincident with the bearing $z$-axis) by arranging pole faces of the disc and annulus so that maximum permeance (the reciprocal of reluctance) exists in the air gap between the disc and annulus.

In accordance with one embodiment of the invention, maximum permeance is achieved by arranging the bearing structure so that each of the disc and annulus has a single pole face of short, axial extent; the pole faces of the disc and annulus have equal axial extents and are normally aligned to attain maximum permeance between them. A first magnetic flux circuit extends ninety degrees in each direction around the annular member, whereby flux entering the annular member along one radial path splits into and traverses $\pm 90°$ paths in the annular member and returns to the disc member along diametrically opposed paths. A pair of such magnetic circuits are provided to stably and passively position the disc and annulus in the plane at right angles to the $z$-axis. This embodiment, however, suffers from the problem of drag losses which arise from the annular member becoming reversibly magnetized in response to the flux flowing in opposite directions through the relatively long, peripheral path of the annulus. The drag losses are detrimental if the annular member is rotated at high speeds, as is frequently the case since it usually functions as the rotor of a motor.

To obviate this problem, in accordance with another embodiment of the invention, an arrangement similar to the prior art is provided wherein a D.C. flux path is arranged so that the flux enters the annular member or ring along one face of the ring and flows in a direction parallel to the shaft axis to another face of the ring, whence it flows back to the centrally located disc in a manner similar to that disclosed in my previously mentioned patent. To obviate the tilting problem of the prior art, the pole face of the disc is shaped so that it lies on or approximately on the periphery of a sphere having its center at the center of the disc. Thereby, as the disc tilts relative to the $x-y$ plane, the spacing between corresponding points on the pole faces of the disc and annulus does not differentially change, which means that the magnetic forces between the corresponding points do not differentially change, and the tendency for the disc to tilt relative to the z axis does not exist, i.e., if tilting starts, there is a restoring force, rather than a destabilizing force, between the disc and annulus. The disc and annulus remain stabilized in the axial (z) direction because of the tendency of the bodies to be aligned through an air gap of maximum permeance, which exists when the disc and annulus pole faces (which have equal axial extent) are aligned. In one configuration, the pole faces of the disc actually are segments of a sphere having its center at the center of the disc. In another configuration, the spherical surface is approximated by providing the pole faces of the disc with a flat beveled surface and choosing the diameter of the disc to be sufficiently large so that the straight pole face approximates the curvature of a large diameter sphere over a small arc. The inclination angle of the beveled surface relative to the z-axis, the diameter of the disc, and the axial length of the pole face approximate a spherical surface sufficiently to enable the reluctance across the air gap to be constant despite tilting of the disc.

The pole face of the annulus is preferably straight and extends in the z-axis direction so that the primary magnetic lines of force enter and leave the annulus at right angles to the z-axis to provide the stiffness required when there is substantial axial loading of the bearing. If axial loading is not expected to be substantial, the pole face of the annulus can also be inclined so that it is generally parallel to and aligned with the disc pole face. This configuration has the advantage of enabling close spacing and a short air gap between the disc and annulus.

Hence, in all embodiments the present invention provides completely stable self-contained support having five degrees of freedom, allowing free or controlled rotation of shaft about a single axis in a flat wheel-like volume. Three of the degrees of freedom ((1) axial or z-axis movement, (2) tilt angle movement about an x-axis in a plane at right angles to the shaft axis, and (3) tilt angle movement in the plane at right angles to the shaft axis about a y-axis at right angles to the x-axis) are passively restrained by providing a magnetic path having maximum permanence in a radial air gap between the disc carrying the shaft and an annulus. The other two degrees of freedom (radial movement between the disc and annulus along the x and y axes) are actively controlled by variable magnetic fields between the two members.

In accordance with another aspect of the invention, control of the radial position of a floating magnetic bearing member is attained by super-imposing variable vernier fluxes on steady, D.C. fluxes that extend from the disc through an air gap to the annulus. The magnetic fluxes extend through the air gap along diametrically opposed paths of the disc and annular member. The vernier flux is arranged so that it aids and opposes the D.C. fluxes in the air gap on the diametrically opposed sides of the bearing. A sensor for the radial position between the disc and annular members is provided to control the vernier flux so that the radial forces between the interior and exterior members remains the same; i.e., the sum of the magnetic and external forces between the members remains constant regardless of the orientation of the shaft being supported relative to the vertical.

An object of the invention is to provide a new and improved magnetic bearing that requires a minimum amount of space along the axis of a shaft being supported.

An additional object of the invention is to provide a new and improved magnetic bearing wherein only a single rotating element is required.

It is another object of the present invention to provide a new and improved radial magnetic bearing.

Another object of the invention is to provide a radially controlled, magnetic bearing having improved passive stability in planes at right angles to the stator.

A further object of the invention is to provide a radial magnetic bearing having an improved magnetic circuit for controlling the radial position between an interior shaft and an exterior carrying member that provides passive stability to the rotating member.

It is an additional object to provide a new and improved radial magnetic bearing having five degrees of freedom, three of which are passively restrained.

In accordance with another aspect of the invention, the annular member is provided with an axially extending, annular slot having a first face on which are mounted permanent magnets forming poles on of a D.C., commutated motor; on a second radially opposed face of the slot, there are pole pieces to provide radially directed flux paths in the slot. The motor includes a stationary armature winding that fits into the slot, between the magnets and pole pieces. The winding is wound so that current flows through it in a direction at right angles to the flux paths in the slot. In response to current being supplied to the winding, the winding produces a flux which interacts with the permanent magnet flux to cause relative rotation between the annulus and the centrally located disc.

It is, accordingly, a further object of the invention to provide a new and improved bearing capable of supporting the rotor of a motor including a fixedly mounted armature winding.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is a perspective view of one embodiment of the bearing structure of the present invention;

FIGS. 2 and 3 are side views taken through the x and y axes of FIG. 1, respectively;

FIG. 4 is a top view of the bearing illustrated in FIG. 1.

DETAILED DESCRIPTION OF THE DRAWING

Figure 5:
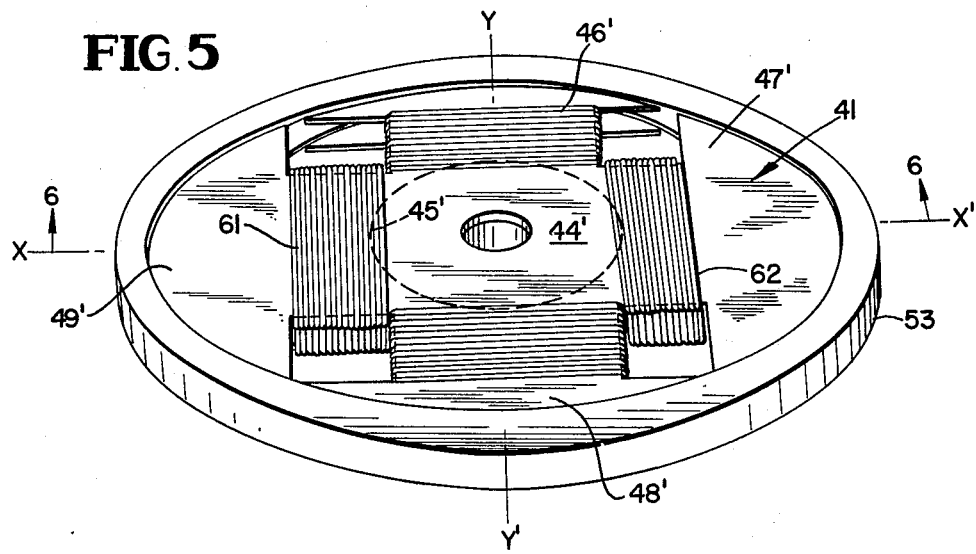
FIGS. 5 and 6 are perspective and side views of a second embodiment of the second invention.

Reference is now made to FIGS. 1-4 of the drawing wherein there is illustrated a single, radial bearing structure which supports an annulus 13 having a longitudinal axis that is coincident with a z-axis of the bearing. Frequently the z-axis is referred to, for convenience, as the vertical axis herein, but it is to be understood that the z-axis can have any orientation. The bearing comprises a central, disc member 11 by which the device is mounted. Member 11 is symmetrical with the z-axis, and is separated by an annular air gap 12 from an annular or ring member 13. Ring member 13 and disc member 11 are normally coaxial with the z-axis and are adapted to be passively restrained to be in the same x–y plane at right angles to the z-axis by magnetic forces that cause flux to extend radially between members 11 and 13. There is no mechanical connection between members 11 and 13; which are positioned relative to each other solely by the magnetic forces developed across air gap 12.

Disc 11 includes an annular permanent magnet 14 that is coaxial with the z-axis and includes permanent magnet poles that are axially disposed along the z-axis; in the configuration illustrated by FIGS. 1–4, the north pole is illustrated as being above the south pole. In abutment with the north pole face of magnet 14 is magnetically permeable hub 35 from which extend in diametrically opposed directions radially directed arms 15 and 16 that are fabricated from material having a high magnetic permeability. Of course, each of hubs 35 and 36 includes a circular aperture through which a fastening bolt (not shown) extends. Arms 15 and 16 include downwardly and outwardly extending portions 17 and 18 which terminate in a plane at right angles to the z-axis midway between the upper and lower faces of magnet 14. Arms 15 and 16 have vertically extending, straight outer edges 19 and 20 which form arcuate (in the x–y plane) pole faces that define the inner boundary of air gap 12. The centers of arms 15 and 16 extend along an x-axis of the bearing coordinate system, whereby each of pole faces 19 and 20 extend for slightly less than ±45° from the x-axis. Abutting against the bottom face of permanent magnet 14 is hub 36 of a high magnetic permeability from which radially directed arms 21 and 22 extend upwardly to the plane lying midway between the upper and lower faces of magnet 14 and thence outwardly to straight vertical edges 23 and 24 to form arcuate (in the x–y plane) pole faces that further define the inner boundaries of air gap 12. The centers of arms 21 and 22 are coincident with the y-axis of the coordinate system and therefore are at right angles to the centers of arms 15 and 16. Also, faces 23 and 24 extend slightly less than ±45° from the y-axis so that an air gap exists between adjacent corners and edges of arms 15, 16, 21 and 22.

Annular member 13 is fabricated of a material having a high magnetic permeability and is preferably fabricated as a number of laminations to minimize eddy current losses. In cross-section, annulus 13 includes a relatively short, vertically extending straight pole face 26 that forms the outer boundary of air gap 12. Pole face 26 has the same vertical length as pole faces 19, 20, 23 and 24 so that substantially all of the magnetic flux crossing air gap 20 enters and leaves the vertical pole faces to provide passive restraint of disc 11 and annular member 13 at the same z-axis position, as well as to maintain the two members in the same plane at right angles to the z-axis.

To provide the maximum permeance in air gap 12 and enable annular member 13 to have relatively large cross-sectional area, annular member 13 tapers along curved edges 27 in both vertical directions and radially outwardly from pole face 26. From the vertical zeniths of curved edges 27, ring 13 has a generally rectangular, relatively large cross-section to prevent magnetic flux saturation over the relatively long, circumferential paths that subsist between the x and y-axes, which define different radii for the permanent magnet flux to leave and enter disc 11 and ring 13. The magnetic flux circuit driven by the steady magneto-motive force of permanent magnet 14 extends radially outwardly from the top faces of permanent magnets 14 along arm portions 17 and 18 to pole tips 19 and 20. From pole tips 19 and 20, the steady flux derived from magnet 14 jumps air gap 12 to pole face 26 and enters ring 13. In ring 13, the flux splits and flows in opposite directions, circumferentially about the ring, until it gets opposite to pole faces 23 and 24 of arms 21 and 22, from whence the flux flows radially inwardly into arms 21 and 22. In arms 21 and 22, the flux returns to the south pole of magnet 14 to complete the circuit. While permanent magnets are illustrated and preferred, it is to be understood that the same result can be achieved by utilizing a single, D.C. electromagnet, if desired.

While the D.C. steady flux derived from permanent magnet passively controls the position of disc 11 and ring 13 so that they are coplanar and at the same z-axis position, the permanent magnet circuit exerts uncontrolled forces on the radial position of the disc and ring members. The radial position between the disc and ring members 11 and 13 is controlled by winding separate coils 31–34 about each of arms 15, 16, 21 and 22, so that the coil axes lie along the x and y axes. Coils 31 and 32 are interconnected with each other either in series or in parallel, as are coils 33 and 34; each pair of coils is supplied with a variable current respectively controlled by the x and y-axis radial positions, as derived from a separate pair of radial position sensors. The radial sensors can be of any well known type, such as the photoelectric type, capacitive type or inductive type.

Figure 10:
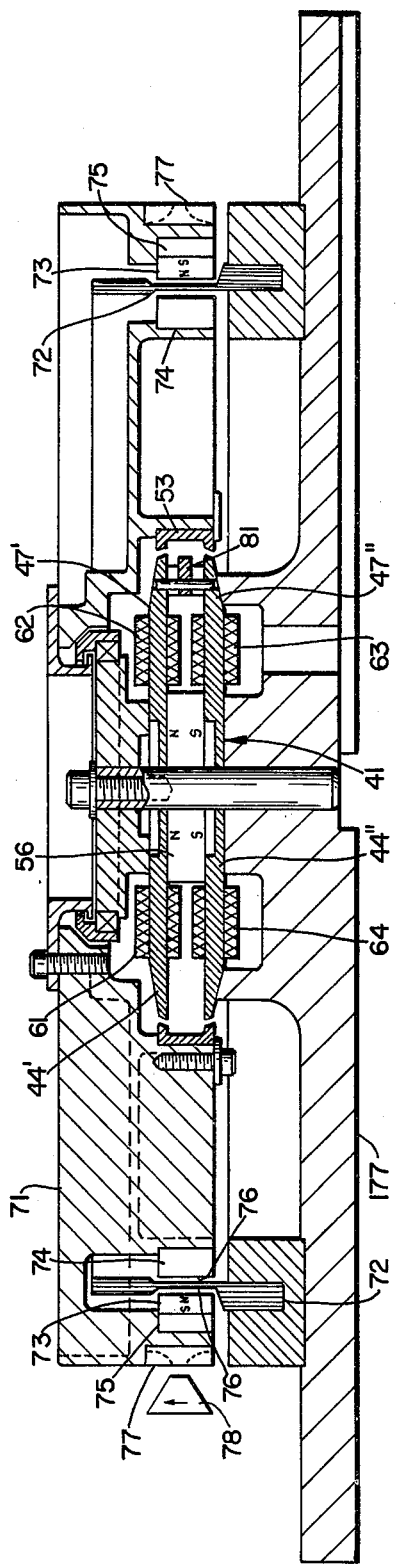
FIG. 10 is a side, cross-sectional view of an application of the bearing illustrated in FIGS. 5-7, wherein the assembly includes a magnetic bearing and a rotor of a D.C. commutated motor having a fixed armature winding.
Figure 11:
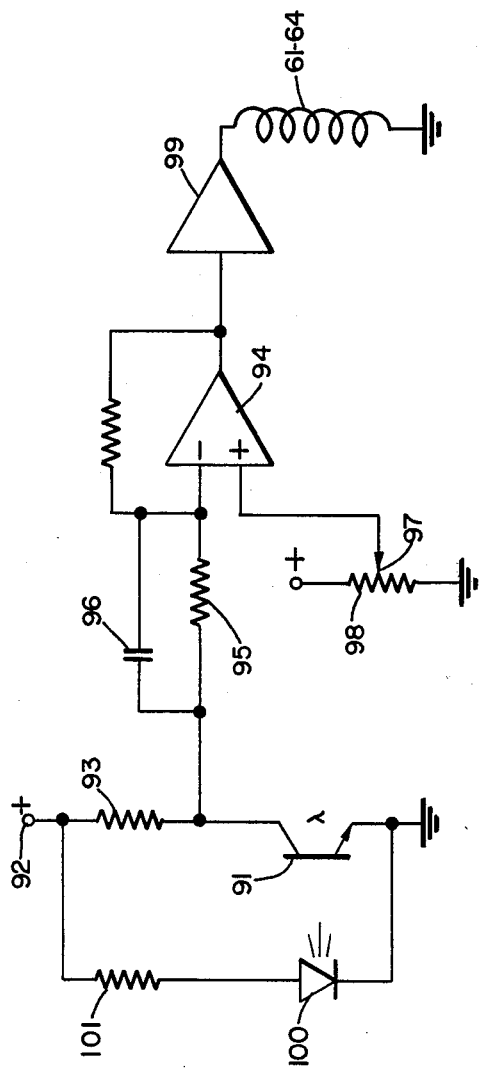
FIG. 11 is a circuit diagram of the apparatus which can be utilized to control the radial position of a rotor in any of the embodiments, although it is particularly adapted to the embodiment of FIG. 10.

Details of one particular sensor system are described infra in connection with FIGS. 10 and 11. In any event, the position sensors sense the x and y-axis radial displacement between pole faces 19, 20, 23 and 24 and pole face 26. In response to the distance between the pole faces being different from a predetermined, desired amount, an error signal is derived to control the current in coils 31–34 and thereby control variable magnetic fluxes in air gap 12. Coils 31–34 are wound so that they are included in two separate magnetic radial controlling circuits with the flux of windings 31 and 32 being in one circuit, and the flux produced by windings 33 and 34 being in a second circuit. The flux produced by windings 31 and 32 flows in the same direction relative to the x axis, while the flux produced by windings 33 and 34 flows in the same direction relative to the y-axis. This result is achieved since arms 15 and 16 are magnetically short-circuited together across the top of permanent magnet 14 by hub 35 while hub 36 provides a similar magnetic short circuit between arms 21 and 22. Because the variable fluxes resulting from energization of coils 31, 32 and coils 33, 34 flow in the same direction in each circuit, the variable fluxes aid the steady, permanent magnet flux on one side of air gap 12 and buck the steady flux on a diametrically opposed side of the air gap. Hence, if it is assumed that coils 31 and 32 are wound so that the variable magnetic flux flows from right to left in FIG. 2, the variable flux the steady flux in the air gap between pole faces 19 and 26, but bucks the steady flux in the air gap between pole faces 20 and 26.

In response to an error subsisting in the radial position between disc 11 and ring 13, current is supplied to coils 31–34 to change the net flux in the air gaps having their boundaries defined by pole faces 19, 20, 23 and 24 to provide radial position centering. Since the magnetic forces tending to stabilize the radial position of members 11 and 13 is proportional to the square of the net flux in the different portions of air gap 12, the control currents supplied to windings 31–34 result in unbalanced forces being applied between members 11 and 13 to counter any disturbing forces.

Since no net change in permeance occurs in air gap 12 in response to radial control between members 11 and 13 and passive restraints exist to provide z-axis and x–y tilt angle stability, rotation about the z-axis (the axis of symmetry) is relatively unconstrained. The bearing is passively stable in torsion (e.g. the xz or yz planes) since the permeance of the steady magnetic circuit decreases whenever members 11 and 13 are not coplanar. It is a property of a suspended magnetic system for elements in that system to have a tendency to align themselves so that a magnetic flux path of maximum permeance exists. Since elements 11 and 13 of the system have pole faces with adjacent edges of the same length, the z-axis location tilt angle of members 11 and 13 are stabilized.

A problem with the bearing structure illustrated in FIGS. 1–4 is that ring 13, if employed as a rotor that turns rapidly about the z-axis, becomes magnetized in opposing directions. The magnetization reversal (four times per revolution) causes drag losses which hinder free rotation of the ring.

Figure 6:
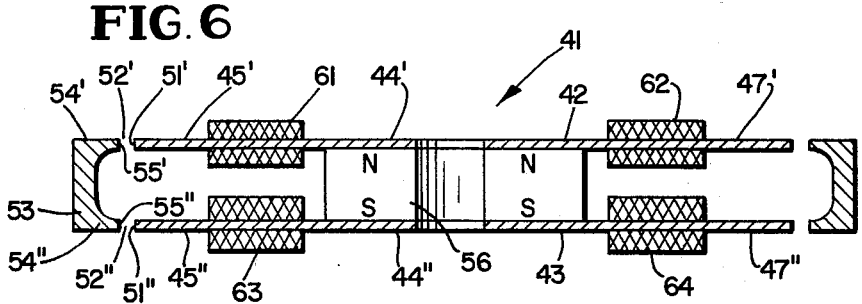

To obviate this disadvantage, the magnetic circuit of the structure illustrated in FIGS. 1–4 is modified, as illustrated in FIGS. 5 and 6, to materially decrease the flux length of the path in annular member 13 and eliminate direction reversals of magnetization. In the embodiment of FIGS. 5 and 6, the steady magnetic flux paths aid and buck the controlled flux paths at diametrically opposed portions of the bearing structure, as in the embodiment of FIGS. 1–4. However, in the embodiment of FIGS. 5 and 6, the flux enters and leaves the annular member at pole faces that are displaced along the z-axis and are substantially aligned in parallel x–y planes, rather than entering and leaving the annular member in the same x–y plane at regions that are displaced approximately 90° from each other. By minimizing the flux path length in the annulus, as is done in the embodiment of FIGS. 5 and 6, the volume and weight of the annulus are decreased, thereby increasing the bearing "pay load." Also, by employing the configuration of FIGS. 5 and 6, the direction of the permanent magnet flux in the annulus does not change with rotation of the annulus so that the frictional torques due to hysteresis and eddy currents are minimal.

The bearing of FIGS. 5 and 6 includes a central, symmetrical disc 41 of material having high magnetic permeability and including substantially identical upper and lower segments 42 and 43 that lie in mutually parallel x–y planes along the z-axis. The different parts of segments 42 and 43 are respectively denoted by ′ and ″ notations to distinguish them; for purposes of convenience, generally only the elements comprising the upper segment 42 are described.

Upper segment 42 includes a central portion 44 from which extend mutually orthogonal arms 45–49. At the end of each of arms 45–48 there is provided an enlarged, flared, sector 49 having an arcuate edge or periphery. The peripheries of these sectors 49 extend slightly less than ±45° from the x and y axes that are respectively coincident with the centers of arms 45, 47 and 46, 48. Each of segments 49 is a sector of the circumference of a circle having its center at the z-axis and includes a short, generally vertically extending edge 51 that comprises a pole face to define the boundary of an air gap 52 between disc member 41 and annulus or ring member 53. Upper and lower arms 45–48 and the outer segments 49 thereof are magnetically separated from each other by an air gap or suitable low magnetic permeability material. The tips of portion 49 adjacent to each other are separated by a relatively small air gap so that the flux in air gap 52 remains substantially constant at all angular positions about the z-axis.

Ring 53 includes a pair of inwardly extending rims 54 that are vertically displaced from each other; each rim includes relatively short generally vertically extending edges 55 that define pole faces for air gaps 52. Pole faces 55 are vertically separated from each other by the same distance as the vertical separation between pole faces 51 so that there is alignment between the upper pole faces 51′ and 55′ of disc 41 and ring 53, as well as between the lower pole faces 51″ and 55″ of the disc and ring; also the vertical extent between the aligned pole faces of the disc and ring is substantially the same. To increase the z-axis bearing stiffness, pole faces 51 and 55 can include vertically aligned teeth (not shown) having the same vertical extent.

A D.C., steady magnetic flux is applied to gaps 52 by a centrally located ring type permanent magnet 56 having upper and lower opposite polarity pole faces abutting against upper and lower hub portions 44′ and 44″. Thereby, a steady magnetic flux flows through upper, outwardly extending arms 45″–48″ to pole faces 51′ and thence across air gap 52′ to pole face 55′ of ring 53. In ring 53, the flux flows vertically to pole face 55′ and jumps across air gap 52″ to pole face 51″ and thence along arms 45″–48″ to the south pole of magnet 56. Thereby, passive restraining forces are provided to maintain disc 41 and ring 53 in the same x–y planes without introducing a circumferential flux path in the ring.

To provide passive stability to ring 53 with regard to the tilt angle of the ring relative to the z-axis, i.e., to assure that the ring and disc are both in a plane at right angles to the z-axis, and to maintain the disc and ring at the same z-axis position, pole faces 51 of the disc 41 are configured to lie on or approximately on the surface of a sphere having its center midway between the centers of the two discs. Thereby, as ring 53 tilts out of the x–y plane, the differential distance between corresponding points on the upper and lower pole faces ′ and 51″ of disc 41 relative to pole faces 55′ and 55″ of disc 41 remains constant. Thereby, the permeance of the magnetic paths between the upper and lower pole faces is the same and the tendency for ring 53 to tilt about the z-axis is overcome. The disc and ring are stabilized at the same z-axis position because the facing edges of pole faces 51′ and 55′, as well as pole faces 51″ and 55″, have the same z-axis extent to provide radially directed, primary magnetic flux lines at right angles to the z axis, when a minimum reluctance flux path exists between the ring and disc.

Several different configurations exist which enable the desired stability to be achieved. In one configuration, illustrated in FIG. 7, the interior member (loosely referred to as disc 57) has arcuately shaped pole faces 51' and 51" that lie on the periphery of a sphere having its center coincident with the center of disc 57. Pole faces 51 are aligned with and have the same vertical extent as the corresponding vertical pole faces 55 on ring 53. Disc 57 may have a height-to-width aspect approaching unity, with the height being limited only to a point where the air gap between the vertical extremities of ring 53 and disc 57 is not so long as to destroy the inherent passive z axis stability of the structure.

Figure 8:
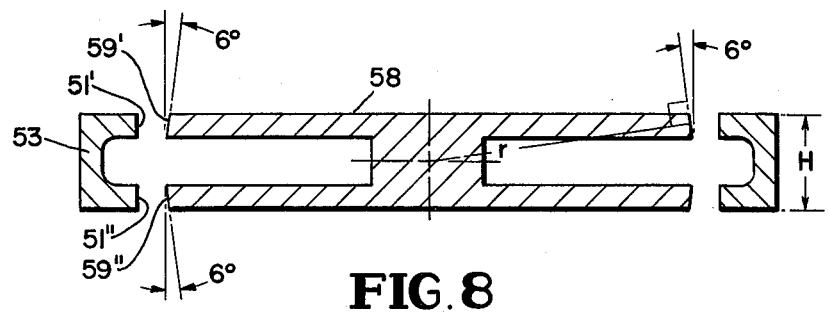

In a second configuration, illustrated in FIG. 8, disc 58 has a sufficiently long diameter ($D = 2r$, where $r =$ distance from center of disc 58 to center of pole face 59) compared to its height (H), e.g., $D/H = 10$, to enable straight pole faces 59, which are inclined toward the z-axis from the central x–y plane of the disc, to approximate the surface of a sphere having its center at the center of the disc. For $D/H = 10$, pole faces 59' and 59" are typically bevelled 6° from the vertical in opposite directions to closely approximate the curvature of a sphere having its center at the center of disc 58 and a radius equal to the distance from the center of the disc to the top and bottom edges of pole faces 59' and 59". Of course, pole faces 51 and 59 are aligned and have the same vertical extent to provide passive z-axis stability and to assist in providing passive x–y plane stability.

Figure 7:
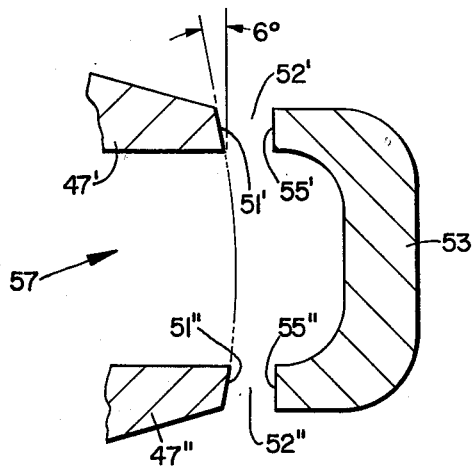
FIGS. 7, 8 and 9 are views of different configurations of the pole faces of the bearing structure illustrated in FIGS. 5 and 6.
Figure 9:
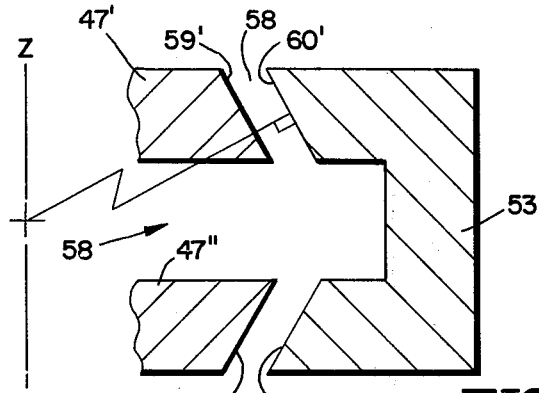

Preferably, pole faces 51 of ring 53, of the embodiments of FIGS. 7 and 8, are vertically directed, with a zero inclination angle to provide maximum z-axis stiffness. However, in certain situations, where z-axis stiffness need not be maximized, but wherein a small air gap is needed, ring 53 is provided with straight pole faces 60 that have the same inclination angle as the corresponding pole faces 59 of disc 58, as illustrated in FIG. 9; thereby, pole faces 60 are inclined to the z-axis so that points midway between the top and bottom edges thereof lie at right angles to a radial line extending through the center of disc 58. Of course, pole faces 60 of ring 53 have the same vertical extent as, and are aligned with, the corresponding pole faces 59 of disc 58.

Control for the radial position between disc 41 and ring 53, which produces changes in the length of radial air gap 52, is attained by providing a pair of orthogonal series magnetic circuits which are arranged so that the magnetic fluxes in the air gap on one side of the bearing structure aid each other, while the magnetic fluxes on the diametrically opposed side of the bearing structure buck each other. This result is achieved by providing a separate coil on each of the eight legs 45'–48' and 45"–48" of disc 41; coils 61–64, on legs 45 and 47 are illustrated while the coils on legs 46 and 48 are not shown. Coils 61–64, on legs 45 and 47 are in a first magnetic circuit, including hub members 44' and 44"; the coils on legs 46 and 48 are in second magnetic circuit including those legs 46 and 48, as well as the hub members 44' and 44". Coils 61–64 are wound so that the control fluxes produced thereby flow in the same direction in the upper and lower arms 45 and 47; with the flux flowing in opposite directions in the upper and lower arms. If it is assumed that the control flux produced by coils 61–64 causes the control flux to flow from right to left in the upper arms and from left to right in the lower arms, the control flux aids the steady flux produced by the permanent magnet in the air gaps at the periphery of arms 45 while the control flux bucks the steady flux in the air gap at the periphery of arms 47. In response to changes in the position of ring 53 along the x-axis relative to disc 41, the current in coils 61–64 is varied to stabilize the relative radial position between the ring and disc along the x-axis. Similarly, in response to a sensor determining that the error exists between the desired and actual position of the disc and ring along the y-axis, the excitation current in windings 65–68 is varied to control the relative position of the disc and ring along the y-axis.

In accordance with a further aspect of the invention, illustrated in FIG. 10, the magnetic bearing structure of FIGS. 5–7 is adapted to function in connection with a D.C., commutated motor having an armature winding 72 that is fixedly mounted relative to disc 41. Ring 53 is fixedly mounted on an interior, circular portion of rotor 71 that is coaxial with and adapted to rotate about the z-axis. Permanent magnets 73 establish a radially directed, permanent magnet field in annular slot 76 of rotor 71 that is coaxial with the z-axis. The magnetic circuit extends through circular pole pieces 74 and 75, on the interior and exterior faces of rotor 71. In a typical configuration, eighteen poles are provided by eighteen sets of magnets 73, forming nine pairs of radially polarized permanent magnet poles so that one magnet of each set is positioned with its north pole closest to the z-axis and the adjoining magnet is positioned with its south pole adjoining the z axis.

Motor action for rotor 71 is provided by fixedly mounting armature winding 72 in slot 76. Winding 72 is wound so that the winding extends parallel to the z-axis in gap 76 so that current flows in the gap at right angles to the direction of the magnet flux produced by permanent magnets 73. The interaction between the current in winding 72 and the permanent magnet flux in gap 76 results in rotation of rotor 71 about the z-axis.

To provide commutation for the current in winding 72, nine optically reflecting slots 77 are provided around the periphery of rotor 71. Reflecting slots 77 selectively chop an optical path provided between a light source and photocell sensor located in housing 78, fixedly mounted just outside the periphery of rotor 71 and in vertical alignment with slots 77. Of course, the number of slots is equal to the number of pole pairs so that in the exemplary situation described, nine reflecting slots 77 are provided. The commutating circuitry for controlling the flow of current to winding 72 in response to the optical energy chopped by reflecting slot 77 is of a type known to those skilled in the art, and may be as described in my U.S. Pat. No. 3,569,814.

X-axis control for the position of rotor 71 relative to disc 41 is photoelectrically provided by mounting a reflective photo sensor 81 midway between the lower and upper edges of arms 47' and 47", in proximity to gap 52. Housing 81 includes a light source and photoelectric sensor which are positioned to generate and be responsive to radially extending light beams. The light beam from the lamp is directed toward the interior face of ring 53, which reflects the light beam back to the photoelectric sensor with a variable intensity, determined by the separation between the interior face of ring 53 and housing 81. As the spacing between the interior face of ring 53 and housing 81 increases, the intensity of the light beam decreases; with the interior face of ring 53 at a predetermined position relative to housing 81, a predetermined amplitude signal is derived from the photoelectric, optical sensor included in housing 81 to stabilize the x-axis position of rotor 71 relative to disc 41 and housing 177. A similar sensing structure (not shown) is provided along the y-axis, at right angles to the x-axis sensor illustrated in FIG. 10.

Control signals for coils 61–64 are derived in response to the position detected by the sensor in housing 81, as well as in response to the rate of change of position with respect to time. Rate control provides adequate damping to insure radial centering and stability of rotor 71 relative to the z-axis. One preferred circuit to achieve position and rate control is illustrated in FIG. 10 as comprising a photo-responsive transistor 91 having its emitter collector path connected to a positive D.C. source at terminal 92 via resistor 93. The voltage developed across the emitter collector path of phototransistor 91 is coupled to an inverting input terminal of operational amplifier 94 via the parallel combination of resistor 95 and capacitor 96. The non-inverting input of amplifier 94 is connected to slider 97 of potentiometer 98 that is energized with a suitable D.C. voltage. The position of slider 97 is adjusted to the desired, radial separation in the x-axis between the pole faces of disc 41 and ring 53 which are in closest proximity to sensor 81. Operational amplifier 94 responds to the difference of the signals applied to its inverting and non-inverting input terminals to supply an error signal to an input terminal of power amplifier 99 that drives windings 61–64, which can be connected in series or parallel, as desired.

While there have been described and illustrated several specific embodiment of the invention, it will be clear that variations in the details of the embodiments specifically illustrated and described may be made without departing from the true spirit and scope of the invention as defined in the appended claims.

What is claimed is:

1. A magnetic bearing comprising an inner member symmetrical about a longitudinal axis and having exterior magnetic pole faces on opposite sides of the axis, an outer member coaxial with the inner member having interior magnetic pole faces on opposite sides of the axis, said inner and outer members being mechanically free of each other, one of said members being fixed relative to the longitudinal axis so that it lies in a plane at right angles to the axis and has a predetermined longitudinal position along the axis, said members being adapted to lie in a common plane and to have radial air gaps between the pole faces on the opposite sides of the axis, boundaries of said air gaps including the interior and exterior pole faces, magnetic circuit means for establishing a different, radially extending magnetic flux in the air gaps on the opposite sides of the axis, the fluxes of said magnetic circuit means being radially directed across the gaps to stablize the longitudinal and angular positions of the inner and outer members relative to the axis so that the inner and outer pole faces are aligned relative to the axis and the members have a zero tilt angle relative to the axis, the means for establishing a closed magnetic path, said path including the air gaps on opposite sides of the axis in series, said magnetic path including means for deriving an additional magnetic flux that flows radially across the air gaps on opposite sides of the axis to control the relative radial positions on the inner and outer members, the additional flux flowing radially in the air gap on one side of the axis in the same direction as the radial flow of flux in the magnetic circuit for the air gap, the additional flux flowing in the air gap on the other side of the axis in the opposite direction as the radial flow of flux in the magnetic circuit on the opposite side of the gap, said inner member having a relatively long length in a plane at a right angles to the axis relative to its length along the axis.

2. The magnetic bearing of claim 1 wherein the inner and outer members have pole faces of relatively short extent in the direction of the axis, each of said magnetic circuits including a path in the outer member so that the flux enters and leaves the outer member along different radii in a plane at right angles to the axis.

3. The magnetic bearing of claim 1 wherein the inner and outer members have aligned pole faces, the pole faces of the inner member having peripheries at least approximately on the surface of a sphere having its center at the center of the inner member, both the inner and outer members including pole faces displaced from each other along the axis so that flux in the magnetic circuit flows out of and into the pole faces of the inner and outer members at locations displaced from each other along the axis.

4. The magnetic bearing of claim 1 further including electric motor means for rotating the inner end outer members relative to each other about the axis, said motor means including a winding fixedly mounted on the inner member so that commutated current flows in the winding in the same direction as the axis, and means fixedly mounted on the outer member for providing a magnetic field directed toward and away from the axis at right angles to the current in the winding so that the magnetic field interacts with a magnetic force derived from the current flowing in the winding to produce motor action between the inner and outer members.

5. A magnetic bearing comprising an inner member symmetrical about a longitudinal axis and having exterior magnetic pole faces on opposite sides of the axis, and outer member coaxial with the inner member having interior magnetic pole faces on opposite sides of the axis, said inner and outer members being mechanically free of each other, one of said members being fixed relative to the longitudinal axis so that it lies in a plane at right angles to the axis and has a predetermined longitudinal position along the axis, said members being adapted to lie in a common plane and to have radial air gaps between the pole faces on the opposite sides of the axis, boundaries of said air gaps including the interior and exterior pole faces, magnetic circuit means for establishing a different, radially extending magnetic flux in the air gaps on the opposite sides of the axis, the fluxes of said magnetic circuit means being radially directed across the gaps to stablize the longitudinal and angular positions of the inner and outer members relative to the axis so that the inner and outer pole faces are aligned relative to the axis and the members have a zero tilt angle relative to the axis, and means for establishing a closed magnetic path, said path including the air gaps on opposite sides of the axis in series, said magnetic path including means for deriving an additional magnetic flux that flows radially across the air gaps on opposite sides of the axis to control the relative radial positions of the inner and outer members, the additional flux flowing radially in the air gap on one side of the axis in the same direction as the radial flow of flux in the magnetic circuit for that air gap, the additional flux flowing in the air gap on the other side of the axis in the opposite direction as the radial flow of flux in the magnetic circuit on the opposite side of the gap, the inner and outer members having pole faces of the same extend along the axis and each of said magnetic circuits including a path in the outer member so that the flux enters and leaves the outer member along different radii in a plane at right angles to the axis.

6. A magnetic bearing comprising an inner member symmetrical about a longitudinal axis and having exterior magnetic pole faces on opposite sides of the axis, an outer member coaxial with the inner member having interior magnetic pole faces on opposite sides of the axis, said inner and outer members being mechanically free of each other, one of said members being fixed relative to the longitudinal axis so that it lies in a plane at right angles to the axis and has a predetermined longitudinal position along the axis, said members being adapted to lie in a common plane and to have radial air gaps between the pole faces on the opposite sides of the axis, boundaries of said air gaps including the interior and exterior pole faces, magnetic circuit means for establishing a different, radially extending magnetic flux in the air gaps on the opposite sides of the axis, the fluxes of said magnetic circuit means being radially directed across the gaps to stabilize the longitudinal and angular positions of the inner and outer members relative to the axis so that the inner and outer pole faces are aligned relative to the axis and the members have a zero tilt angle relative to the axis, and means for establishing a closed magnetic path, said path including the air gaps on opposite sides of the axis in series, said magnetic path including means for deriving an additional magnetic flux that flows radially across the air gaps on opposite sides of the axis to control the relative radial positions of the inner and outer members, the additional flux flowing radially in the air gap on one side of the axis in the same direction as the radial flow of flux in the magnetic circuit for that air gap, the additional flux flowing in the air gap on the other side of the axis in the opposite direction as the radial flow of flux in the magnetic circuit in the opposite side of the gap, the inner and outer members having aligned pole faces, the pole faces of the inner member being arcuate surfaces on the periphery of a sphere having its center at the center of the inner member, both the inner and outer members including pole faces displaced from each other along the axis so that flux in the magnetic circuit flows out of and into the pole faces of the inner and outer members at locations displaced from each other along the axis.

7. The magnetic bearing of claim 6 wherein the pole faces of the outer member have a zero inclination angle relative to the axis.

8. The magnetic bearing of claim 7 wherein the pole faces of the inner and outer members have the same extent along the axis.

9. A magnetic bearing comprising an inner member symmetrical about a longitudinal axis and having exterior magnetic pole faces on opposite sides of the axis, and outer member coaxial with the inner member having interior magnetic pole faces on opposite sides of the axis, said inner and outer members being mechanically free of each other, one of said members being fixed relative to the longitudinal axis so that it lies in a plane at right angles to the axis and has a predetermined longitudinal position along the axis, said members being adapted to lie in a common plane and to have radial air gaps between the pole faces on the opposite sides of the axis, boundaries of said air gaps including the interior and exterior pole faces, magnetic circuit means for establishing a different, radially extending magnetic flux in the air gaps on the opposite sides of the axis, the fluxes of said magnetic circuit means being radially directed across the gaps to stabilize the longitudinal and angular positions of the inner and outer members relative to the axis so that the inner and outer pole faces are aligned relative to the axis and the members have a zero tilt angle relative to the axis, and means for establishing a closed magnetic path, said path including the air gaps on opposite sides of the axis in series, said magnetic path including means for deriving an additional magnetic flux that flows radially across the air gaps on opposite sides of the axis to control the relative radial positions of the inner and outer members, the additional flux flowing radially in the air gap on one side of the axis in the same direction as the radial flow of flux in the magnetic circuit for that air gap, the additional flux flowing in the air gap on the other side of the axis in the opposite direction as the radial flow of flux in the magnetic circuit on the opposite side of the gap, the inner and outer members having aligned pole faces, the pole faces of the inner member having peripheries at least approximately on the surface of the sphere having its center at the center of the inner member, the inner member having a relatively long length in a plane at right angles to the axis relative to its length along the axis, both the inner and outer members including pole faces displaced from each other along the axis so that flux in the magnetic circuit flows out of and into the pole faces of the inner and outer members at locations displaced from each other along the axis, the pole faces being straight surfaces having a relatively small, non-zero inclination angle to the axis, the pole faces additionally being on opposite sides of the center of the inner member and being oppositely inclined relative to the axis.

10. The magnetic bearing of claim 9 wherein the pole faces of the outer member have a zero inclination angle relative to the axis.

11. The magnetic bearing of claim 10 wherein the pole faces of the inner and outer members have the same extent along the axis.

12. The magnetic bearing of claim 9 wherein the pole faces of the outer member have the same inclination angle relative to the axis as the pole faces of the inner member with which they are aligned.

13. The magnetic bearing of claim 12 wherein the pole faces of the inner and outer members have the same extent along the axis.

14. A magnetic bearing mutually orthogonal $x$, $y$ and $z$-axes comprising an inner disc member, said disc beng symmetrical about the $z$-axis, an annular, outer member coaxial with and surrounding the disc, said members being mechanically free of each other, said members being adapted to lie in a common $x$–$y$ plane and to have a plurality of radial air gaps between them, a first pair of said gaps being on diametrically opposed sides of the $z$-axis along the $x$-axis, a second pair of said gaps being on diametrically opposed sides of the $z$-axis along the $y$-axis, each of said gaps having boundaries defined by pole faces on opposed surfaces of the members, means for establishing a plurality of magnetic circuits, each circuit including a pair of radial air gaps and a portion of the annular member, said circuits including first permanent magnet means for supplying radially directed magnetic flux in a predetermined direction across the mutually orthogonal air gaps to stabilize the longitudinal position of the pole faces of both members relative to the $z$-axis and to stabilize the angular position of the pole faces of both members so they lie in the

*x–y* plane, a pair of closed magnetic paths, a first of the paths including said first pair of gaps in series, a second of the paths including said second pair of gaps in series, each of said paths including second magnet means for supplying radially directed flux across one of the gaps in its respective circuit in the same direction as the predetermined direction and for supplying radially directed flux across the other gap in its respective circuit in the direction opposite from the predetermined direction to control the radial position between the members in the *x–y* plane.

15. The bearing of claim 14 wherein the radial air gaps of each magnetic circuit are substantially aligned with the *x* and *y*-axes and the circuit includes a portion of the annular member circumferentially extending between the *x* and *y*-axes so that the flux: (a) enters the annular member substantially in alignment with an axis in the *x–y* plane, (b) traverses a circumferential path of approximately 90° in the annular member and (c) leaves the annular member substantially in alignment with an axis orthogonal to the axis where the flux entered.

16. The magnetic bearing of claim 15 wherein the pole faces of the inner and outer members have the same extent along the *z*-axis.

17. The bearing of claim 14 wherein the radial air gaps of each magnetic circuit are substantially aligned with the *x* and *y*-axes and the circuit includes a portion of the annular member extending in a direction along the *z*-axis so that the flux of each circuit enters and leaves the annular member at substantially aligned positions in different *x–y* planes along the *z*-axis.

18. The magnetic bearing of claim 17 wherein the pole faces of the inner member have peripheries at least approximately on the surface of a sphere having its center at the center of the inner member.

19. The magnetic bearing of claim 18 wherein the pole faces of the inner are arcuate surfaces on the periphery of the sphere.

20. The magnetic bearing of claim 19 wherein the pole faces of the outer member have a zero inclination angle relative to the *z*-axis.

21. The magnetic bearing of claim 18 wherein the inner member has a relatively long length in a plane at right angles to the *z*-axis relative to its length along the *z*-axis, and the pole faces are straight surfaces having a relatively small, non-zero inclination angle to the *z*-axis, the pole faces displaced along the *z*-axis on opposite sides of the center of the inner member being oppositely inclined relative to the *z*-axis.

22. The magnetic bearing of claim 21 wherein the pole faces of the outer member have a zero inclination angle relative to the *z*-axis.

23. The magnetic bearing of claim 21 wherein the pole faces of the outer member have the same inclination angle relative to the *z*-axis as the pole faces of the inner member with which they are aligned.

24. The magnetic bearing of claim 14 further including electric motor means for rotating the inner and outer members relative to each other about the *z*-axis, said motor means including a winding fixedly mounted on the inner member so that commutated current flows in the winding in the same direction as the axis, and means fixedly mounted on the outer member for providing a radial magnetic field at right angles to the current in the winding so that the magnetic field interacts with a magnetic force derived from the current flowing in the winding to produce motor action between the inner and outer members.

25. A magnetic bearing having mutually orthogonal *x*, *y* and *z*-axes comprising an inner disc member, said disc being symmetrical about the *z*-axis, an annular outer member coaxial with and surrounding the disc, said members being mechanically free of each other, said members being adapted to lie in a common *x–y* plane and to have a plurality of radial air gaps between them, a first part of said gaps being on diametrically opposed sides of the *z*-axis along the *x*-axis, a second pair of said gaps being on diametrically opposed sides of the *z*-axis along the *y*-axis, each of said gaps having boundaries defined by pole faces on opposed surfaces of the members, means for establishing a plurality of magnetic circuits, each circuit including a pair of radial air gaps and a portion of the annular member, said circuits including first permanent magnet means for supplying radially directed magnetic flux in a predetermined direction across the mutually orthogonal air gaps to stabilize the longitudinal position of the pole faces of both members relative to the *z*-axis and to stabilize the angular position of the pole faces of both members so they lie in the *x–y* plane, the radial air gaps of each magnetic circuit being substantially aligned with the *x* and *y* axes, said circuits including a portion of the annular member circumferentially extending between the *x* and *y* axes so that the flux: (a) enters the annular member substantially in alignment with the *z*-axis in the *x–y* plane, (b) traverses a circumferential path of approximately 90° in the annular member and (c) leaves the annular member substantially in alignment with an axis orthogonal to the axis where the flux entered, and means for controlling the radial position between the inner and outer members relative to the *z*-axis in the *x–y* plane.

26. The magnetic bearing of claim 25 wherein the pole faces of the inner and outer members have the same extent along the *z*-axis.

27. A magnetic bearing having mutually orthogonal *x*, *y* and *z*-axes comprising an inner disc member, said disc being symmetrical about the *z*-axis, an annular, outer member coaxial with and surrounding the disc, said members being mechanically free of each other, said members being adapted to lie in a common *x–y* plane and to have a plurality of radial air gaps between them, a first pair of said gaps being on diametrically opposed sides of the *z*-axis along the *x*-axis, a second pair of said gaps being on diametrically opposed sides of the *z*-axis along the *y*-axis, each of said gaps having boundaries defined by pole faces on opposed surfaces of the members, means for establishing a plurality of magnetic circuits, each circuit including a pair of radial air gaps and a portion of the annular member, said circuits including first permanent magnetic means for supplying radially directed magnetic flux in a predetermined direction across the mutually orthogonal air gaps to stabilize the longitudinal position of the pole faces of both members relative to the *z*-axis and to stabilize the angular position of the pole faces of both members so they lie in the *x–y* plane, the radial air gaps of each magnetic circuit being substantially aligned with the *x* and *y*-axes, said circuits including a portion of the annular member extending in a direction along the *z*-axis so that the flux of each circuit enters and leaves the annular member at substantially aligned positions in different *x–y* planes along the *z*-axis, the pole faces of the inner member having peripheries at least approximately on the surface of a sphere having its center at the center of the inner member, and means for controlling the radial position between the inner and outer members relative to the z-axis in the x–y plane.

28. The magnetic bearing of claim 27 wherein the pole faces of the inner members are arcuate surfaces on the periphery of the sphere.

29. The magnetic bearing of claim 28 wherein the pole faces of the outer member have a zero inclination angle relative to the axis.

30. The magnetic bearing of claim 27 wherein the inner member has a relatively long length in a plane at right angles to the z-axis relative to its length along the z-axis, and the pole faces are straight surfaces having a relatively small, non-zero inclination angle to the z-axis, the pole faces displaced along the z-axis on opposite sides of the center of the inner member being oppositely inclined relative to the axis.

31. The magnetic bearing in claim 30 wherein the pole faces of the outer member have a zero inclination angle relative to the z-axis.

32. The magnetic bearing of claim 30 wherein the pole faces of the outer member have the same inclination angle relative to the z-axis as the pole faces of the inner member with which they are aligned.

33. The magnetic bearing of claim 27 further including electric motor means for rotating the inner and outer members relative to each other about the z-axis, said motor means including a winding fixedly mounted on the inner member so that commutated current flows in the winding in the same direction as the axis, and means fixedly mounted on the outer member for providing a radial magnetic field at right angles to the current in the winding so that the radial magnetic field interacts with a magnetic force derived from the current flowing in the winding to produce motor action between the inner and outer members.

* * * * *